US006432030B1

(12) United States Patent
Miller

(10) Patent No.: US 6,432,030 B1
(45) Date of Patent: Aug. 13, 2002

(54) WATER-COOLED ROLL

(75) Inventor: Daniel V. Miller, Everson, PA (US)

(73) Assignee: Duraloy Technologies, Inc., Scottdale, PA (US)

(*) Notice: Subject to any disclaimer, the term of this patent is extended or adjusted under 35 U.S.C. 154(b) by 0 days.

(21) Appl. No.: 09/386,496

(22) Filed: Aug. 30, 1999

Related U.S. Application Data

(60) Provisional application No. 60/099,015, filed on Sep. 3, 1998.

(51) Int. Cl.[7] .................................................. B23P 15/00

(52) U.S. Cl. ............................ 492/30; 492/46; 432/236

(58) Field of Search .............................. 492/46, 56, 48, 492/49, 39, 45, 30; 29/894.37, 894.3, 894.31, 894.32, 894.322; 432/236

(56) References Cited

U.S. PATENT DOCUMENTS 2,045,773 A 6/1936 Havey ........................... 263/6
2,085,575 A 6/1937 Desbordes et al. ............ 49/14
3,860,387 A 1/1975 Bricmont .................... 432/246
3,965,974 A * 6/1976 Sernetz et al. ................ 165/89
4,991,276 A * 2/1991 Bricmont ...................... 29/124
5,082,047 A 1/1992 Bricmont .................... 164/476
5,341,568 A 8/1994 Bricmont et al. ........ 29/895.32
5,362,230 A * 11/1994 Facco .......................... 432/236
5,370,530 A * 12/1994 Facco .......................... 432/236
5,421,724 A * 6/1995 Facco .......................... 432/236

FOREIGN PATENT DOCUMENTS

GB 429626 7/1935

* cited by examiner

*Primary Examiner*—I Cuda Rosenbaum
(74) *Attorney, Agent, or Firm*—Webb Ziesenheim Logsdon Orkin & Hanson, P.C.

(57) ABSTRACT

A water-cooled roll is used for transporting material in a heated environment. The roll includes a hollow rotatable arbor with a system for supplying cooling water to the interior of the arbor. A plurality of annular tires are spaced along the arbor, each tire including a plurality of recesses spaced along an inner periphery of the tire on opposite sides of the tire. A plurality of locking bars are attached to the arbor, each locking bar extending into one recess of one tire. Each tire includes at least two locking bars extending into recesses thereof for rotationally and axially positioning the tire on the arbor.

19 Claims, 6 Drawing Sheets

WATER-COOLED ROLL

BACKGROUND OF THE INVENTION

This invention claims the benefit of U.S. Provisional Patent Application Serial No. 60/099,015, filed Sept. 3, 1998.

1. Field of the Invention

The present invention relates to a roll for transporting workpieces in heated environments, more particularly, the present invention relates to a water-cooled roll for a roller hearth furnace.

2. Background Information

A variety of water-cooled roll designs have been proposed. For example, U.S. Pat. Nos. 5,379,829; 5,082,047; and 4,991,276 all disclose a water-cooled roll design with a "flexible" arbor intended to bend and guide the workpiece. The tires are provided with extensions from one side thereof for attachment to the arbor. The tires are also provided with reduced section areas and openings to reduce heat flow from the work supporting surface of the tire to the arbor. These features combine to form a tire with a complex shape which is not easy to manufacture or assemble in the roll. A sample of earlier water-cooled roll designs are found in U.S. Pat. Nos. 2,085,575; 2,045,773; and 3,860,387.

These existing devices do not provide a simplified water-cooled roll design which is cost-effective to manufacture and still sufficiently minimize the heat flow from the work contacting surface to the arbor. It is the object of the present invention to overcome the aforementioned drawbacks of the prior art.

SUMMARY OF THE INVENTION

The above objects are achieved with a water-cooled roll according to the present invention. The roll includes a hollow rotatable arbor with a system for supplying cooling water to the interior of the arbor. A plurality of annular tires are spaced along the arbor, with each tire including a plurality of recesses spaced along an inner periphery of the tire on opposite sides of the tire. A plurality of locking bars are attached to the arbor, each locking bar extending into one recess of one tire. Each tire includes at least two locking bars extending into recesses thereof for rotationally and axially positioning the tire on the arbor.

In one embodiment of the present invention an annular body of each tire is tapered radially inwardly from the outermost work contacting surface to a position of the recesses. The recesses on one side of the annular body may be angularly offset from the recesses on the other side of the annular body. For example, the recesses on one side of the annular body may be offset from each other by about 90 degrees and the recesses on one side of the annular body may be offset from the recesses on the other side of the annular body by about 45 degrees. In one embodiment of the present invention, each recess has a pair of generally planar abutment walls and a substantially planar back wall, each adapted to abut against a locking bar.

In one embodiment of the present invention, the system for supplying cooling water to the arbor includes a water supply pipe positioned within the arbor, spaced from the inner walls thereof by a plurality of spacers on an outer periphery of the pipe to create an annular space therebetween. In order to position the pipe within the arbor, an end cap may be secured to one end of the arbor and a pipe end holder may extend into the arbor at an opposite end of the arbor with the pipe end holder coupled to the pipe.

These and other advantages of the present invention will be clarified in the description of the preferred embodiments taken together with the attached figures wherein like reference numerals represent like elements throughout.

DETAILED DESCRIPTION OF THE PREFERRED EMBODIMENTS

Figure 1:
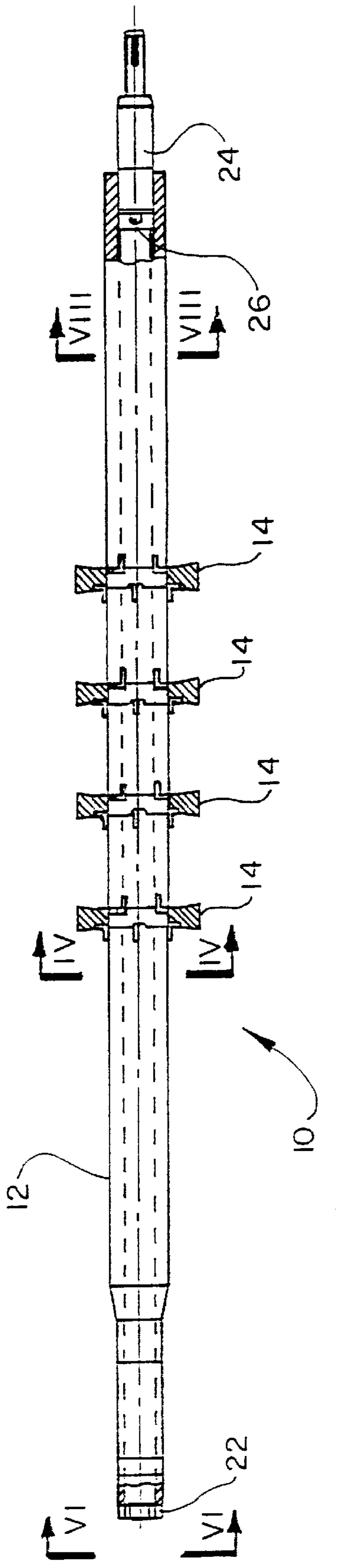
FIG. 1 is a side view, partially in section, of a water-cooled roll according to the present invention.
Figure 3:
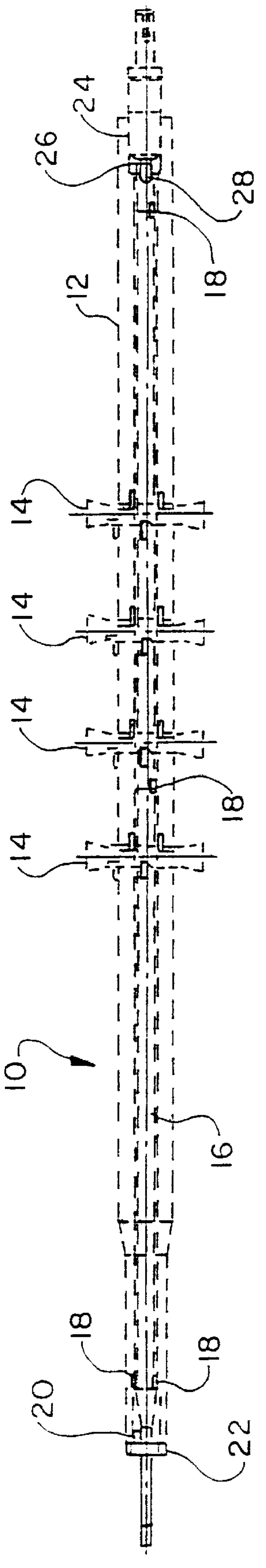
FIG. 3 is a side view of the water-cooled roll shown in FIG. 1 illustrating the positioning of the water supply pipe within the arbor of the water-cooled roll of FIG. 1.

FIGS. 1 and 3 illustrate a water-cooled roll 10 according to the present invention. The water-cooled roll 10 generally includes a hollow rotatable arbor 12 with a system for supplying cooling water to the interior of the arbor 12, and a plurality of annular tires 14 spaced along the arbor 12. Within the meaning of the present application, the term "water-cooled" is not intended to be limited to water since any cooling fluid may be utilized, as desired. These types of internally cooled rolls are generally called "water-cooled" rolls. The arbor 12 is sized to minimize the deflection of the roll 10 under loading by the workpiece. Of course, it is understood that all rolls will deflect, to some extent, under loading, however, the arbor 12 is sized to provide a relatively stiff structure. For example, the outer diameter of the arbor 12 at the position of the tires 14 is about 6" with an inner diameter of about 3". The outer diameter of the left hand side of the arbor 12 is reduced for positioning of the arbor 12 within a bearing assembly (not shown).

The tires 14 are generally set a fixed distance apart from each other, for example, 10". The tires 14 are not positioned symmetrically about the center point of the arbor 12. The center point of the arbor 12 is the centerline of the furnace in which the roll 10 is to operate. This asymmetrical positioning of the tires 14 about the center point allows for staggering of the positioning of tires 14 on adjacent rolls 10 in a furnace to help prevent marks on the workpieces. An adjacent roll 10 will have the tires 14 positioned about the center point of the arbor 12 in a mirror image of that shown in FIGS. 1 and 3.

Figure 2:
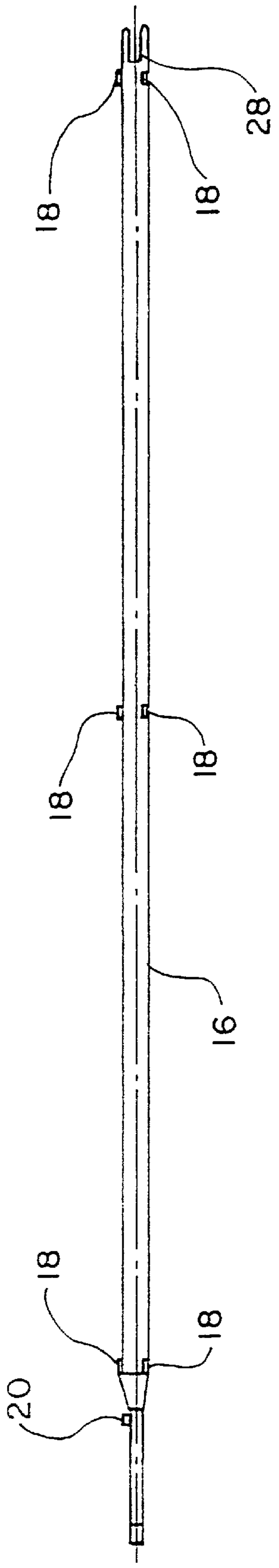
FIG. 2 is a side view of a water supply pipe for the water-cooled roll of FIG. 1.
Figure 7:
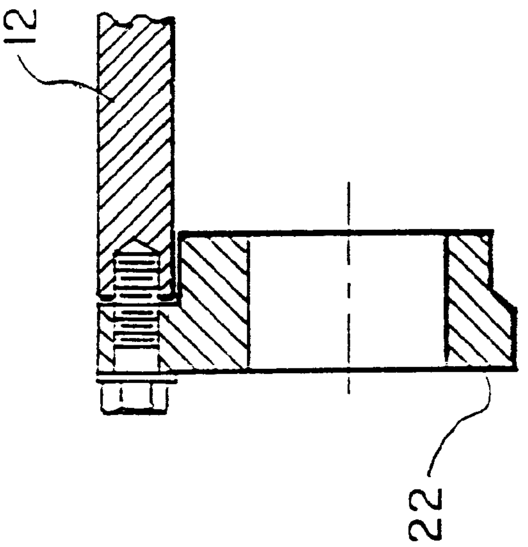
FIG. 7 is a sectional view of the end cap illustrated in FIG. 6.
Figure 6:
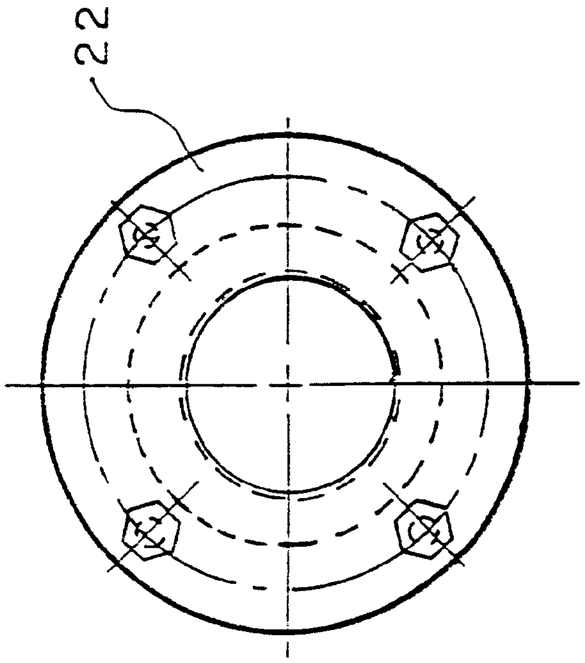
FIG. 6 is an end view of an end cap for the bolster arrangement of the water-cooled roll of FIG. 1.
Figure 9:
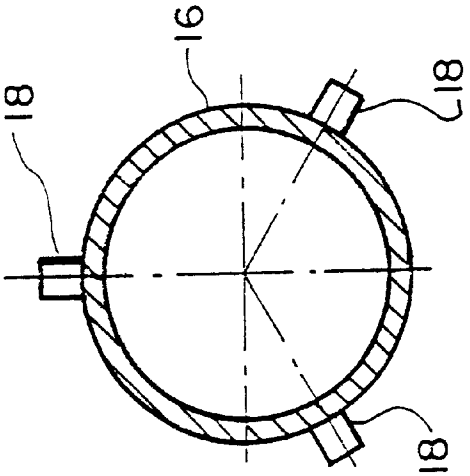
FIG. 9 is a sectional view of the water supply pipe illustrated in FIG. 2.
Figure 8:
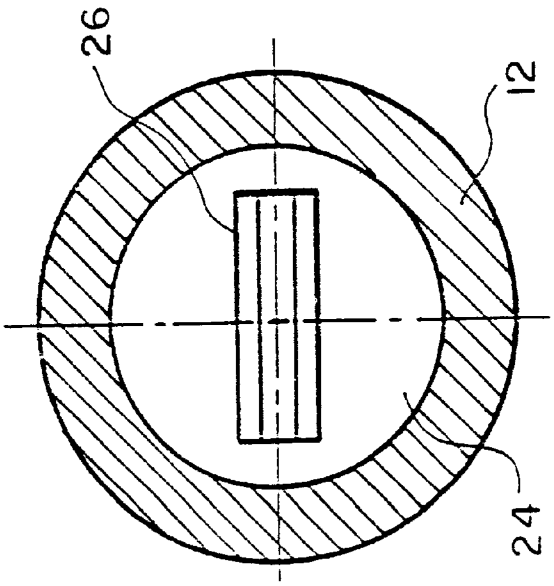
FIG. 8 is a section view of the roll of FIG. 1 taken along line VIII—VIII showing an end view of an end pipe holder for the water supply pipe of the water-cooled roll of FIG. 1.

The system for supplying cooling fluid to the interior of the arbor 12 is shown in FIGS. 2–3. The central core of the supply system is shown in FIG. 2 and is essentially a water supply pipe 16 which is positioned within the arbor 12 and spaced from the inner walls thereof by a plurality of spacers 18 on an outer periphery of the pipe 16 to create an annular space between the pipe 16 and the arbor 12. The pipe 16 is not shown in FIG. 1. The spacers 18 are best illustrated in FIG. 9 and are provided along the length of the pipe 16, as needed. A stop 20 is on the pipe 16 adjacent a first end thereof and abuts against an end cap 22 which is bolted to one end of the arbor 12 to position the pipe 16 within the arbor 12. The end cap 22 is best illustrated in FIGS. 6 and 7. At the other end of the arbor 12, the pipe 16 is positioned by a pipe end holder 24 which extends into the interior of the arbor 12 and is coupled to the pipe 16. The pipe end holder 24 may be received within a bearing assembly (not shown) for supporting the roll 10. The pipe end holder 24 includes a key 26 extending from an end face thereof, as shown in FIGS. 3 and 8. The key 26 is received in a pair of slots 28 formed in the end of the pipe 16. As shown in FIG. 3, the slots 28 (only one of which is shown in the figures) extend beyond the depth of the key 26. This configuration allows the cooling water, or other fluid, to flow down the interior of the pipe 16 to the slots 28, through the slots 28 and back down the length of the pipe 16 and arbor 12 in the annular space formed therebetween.

The roll 10 may be installed, rotated, and supplied with cooling fluid in a conventional fashion. As noted above, the roll 10 will generally be installed in a roller hearth furnace, or other heated environment with a series of other rolls 10, wherein adjacent rolls 10 have offset tires 14. The most significant features of the roll 10 are in the design of the tires 14 and the attachment or positioning of the tires 14 onto the arbor 12.

Figure 5:
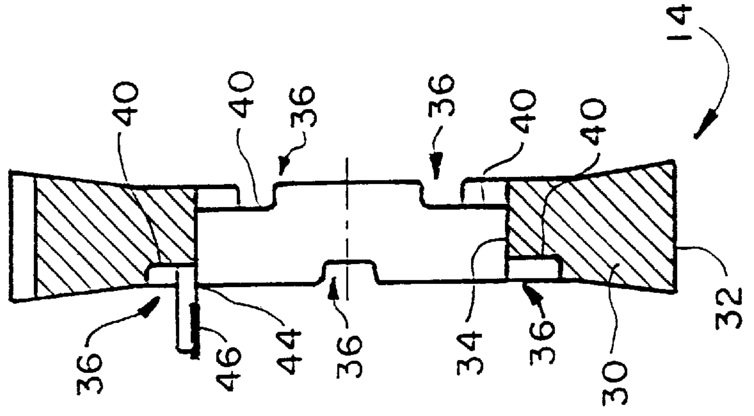
FIG. 5 is a section view of the tire arrangement shown in FIG. 4 taken along line V—V illustrating the tire arrangement and tire connection for the water-cooled roll of FIG. 1.
Figure 4:
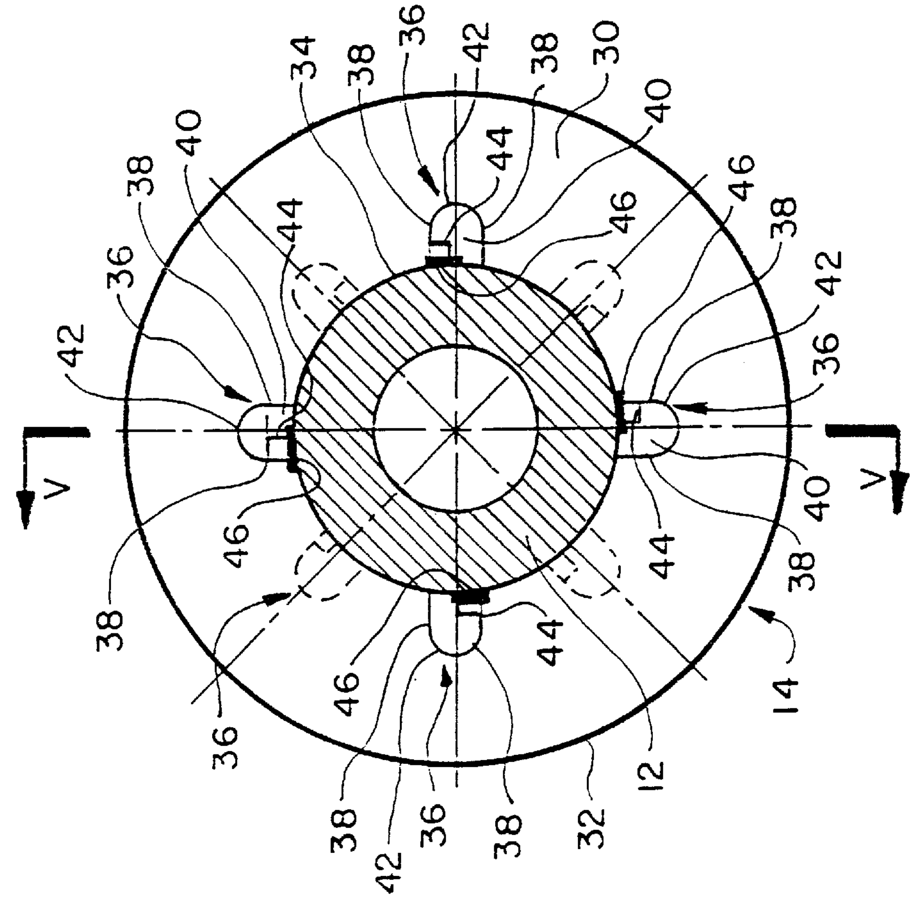
FIG. 4 is a section view of the water-cooled roll shown in FIG. 1 taken along line IV—IV illustrating a tire arrangement and tire connection for the water-cooled roll of FIG. 1.

The details of the construction of the tires 14 and the attachment of the tires 14 to the arbor 12 is best illustrated in FIGS. 4–5. Each tire 14 is formed as an annular body 30 having an outer work contacting surface 32 and an inner bore 34 sized to receive the arbor 12 therein. A plurality of recesses 36 are adjacent the inner bore 34 on opposite sides of the annular body 30. The annular body 30 is tapered from the work contacting surface 32 to the recesses 36, as shown in FIG. 5. For example, the width of the work contacting surface 32 may be about 2 ¼" and the width of the annular body 30 at the position of the recesses 36 is about 1 ¾" (which includes the depth of a recess 36 at that point as illustrated in FIG. 5).

Four recesses 36 are positioned on each side of the annular body 30. Recesses 36 on one side of the annular body 30 are offset from the recesses 36 on the other side of the annular body 30. Specifically, recesses 36 on one side of the annular body 30 are offset from each other by about 90 degrees and the recesses 36 on one side of the annular body 30 are offset from the recesses 36 on the other side of the annular body 30 by about 45 degrees. Other specific numbers of recesses 36 and spacings therebetween are also possible.

Each recess 36 has a depth of about one quarter of the thickness of the annular body 30, such as about 7/16", at a position of the recesses 36. Each recess 36 has a pair of generally planar abutment walls 38 on opposed sides of the recess 36 and a substantially planar back wall 40. The side abutment walls 38 are attached by a curved upper wall 42. The upper wall 42 is curved to reduce stresses in the annular body 30. The recesses 36 provide for positioning or attachment of the tire 14 to the arbor 12 as will be described. Additionally, the recesses 36 serve to reduce the effective width of the annular body 30 to reduce the heat transferred to the arbor 12 from the work contacting surface 32.

A plurality of locking bars 44 are attached to the arbor 12 by welding, as shown by weld rods 46. Each locking bar 44 may be formed easily of bar stock material. As shown in FIG. 5 each weld rod 46 is spaced from the annular body 30 which prevents the welding process from effecting the tire 14. The arbor 12 is omitted from FIG. 5 for clarity. Each locking bar 44 extends into one recess 36 of one tire 14, abutting against one abutment wall 38 and the back wall 40 for positioning or attachment of the tire 14 on the arbor 12. In general, each recess 36 will have a locking bar 44 extending therein. At a minimum, each tire 14 includes at least two locking bars 44 extending into recesses 36 thereof for rotationally and axially positioning the tire 14 on the arbor 12. Additionally, it will be apparent that, at a minimum, some locking bars 44 will have to be positioned on opposite sides of the tire 14 and against opposed respective abutment walls 38. For example, the arrangement shown in FIG. 4 shows locking bars 44 on one side of the tire 14 preventing clockwise rotation of the tire 14 relative to the arbor 12 and locking bars 44 on the opposite side (shown in phantom) preventing counterclockwise rotation. Many alternative arrangements are possible within the present invention.

The tire 14 and roll 10 of the present invention provide a simpler, more easily constructed roll 10 than prior art designs. Specifically, the tire 14 provides a simple attaching or positioning system, while also providing for minimizing heat transfer from the work contacting surface 32 to the arbor 12. The simple and effective tire attaching system of the present invention provides significant savings in capital and manufacturing costs. Additionally, the compact design of the tires 14 will provide some advantages over some prior art structures, which include extensions from the tire body.

Various changes may be made to the present invention without departing from the spirit or scope thereof. For example, while the present invention is particularly suited for transporting metal products in a roller hearth furnace, it may have other applications in other conveying systems. Consequently, the above embodiments are intended to be illustrative of the present invention and not restrictive thereof. The scope of the present invention is defined by the appended claims and equivalents thereto.

What is claimed is:

1. A water-cooled roll comprising:

a hollow rotatable arbor;

means for supplying cooling water to said arbor;

a plurality of annular tires spaced along said arbor, each said tire including a plurality of recesses aced along an inner periphery of said tire on opposite sides of said tire; and a plurality of locking bars attached to said arbor, each said locking bar extending into one said recess of one said tire, wherein each said tire includes at least two said locking bars extending into recesses thereof for rotationally and axially positioning said tire on said arbor.

2. The roll of claim 1 wherein said means for supplying cooling water to said arbor includes a water supply pipe positioned within said arbor spaced from the inner walls thereof to create an annular space therebetween.

3. The roll of claim 1 wherein each said tire is tapered radially inwardly from an outermost work contacting surface to a position of said recesses.

4. The roll of claim 1 wherein said recesses on one side of each said tire are offset from said recesses on the other side of said tire.

5. The roll of claim 4 wherein said recesses on one side of said tire are offset from each other by about 90 degrees and said recesses on one side of said tire are offset from said recesses on the other side of said tire by about 45 degrees.

6. The roll of claim 1 wherein each said locking bar is attached to said arbor at a position spaced from said tire of said recess into which said locking bar extends.

7. The roll of claim 6 wherein said locking bar is welded to said arbor.

8. The roll of claim 1 wherein said means for supplying cooling water to said arbor includes:

a water supply pipe positioned within said arbor spaced from the inner walls thereof by a plurality of spacers on an outer periphery of said pipe to create an annular space therebetween;

an end cap secured to one end of said arbor for positioning said pipe within said arbor; and a pipe end holder extending into said arbor at an opposite end of said arbor, said pipe end holder coupled to said pipe for positioning said pipe within said arbor.

9. The roll of claim 1 wherein each said recess has a pair of generally planar abutment walls, wherein each said locking bar abuts one said abutment wall.

10. The roll of claim 9 wherein each said recess has a substantially planar back wall, wherein each said locking bar abuts one said back wall.

11. The roll of claim 1 wherein each s aid recess has a depth of about one quarter of the thickness of said roll at a position of said recesses.

12. A tire for attachment to a work transporting roll, said tire comprising:

an annular body having an outer work contacting surface and an inner bore sized to receive an arbor of the work transporting roll therein; and a plurality of recesses adjacent said inner bore on opposite sides of said annular body, wherein each said recess is adapted to receive a locking member therein for securing said tire to the arbor of the work transporting roll, wherein each said recess has a pair of planar abutment walls adapted to abut against the locking member and a back wall extending between said abutment walls, each said abutment wall extending radially and parallel to a longitudinal axis of said tire and to a longitudinal axis of the work transporting roll.

13. The tire of claim 12 wherein said annular body is tapered radially inwardly from said outermost work contacting surface to a position of said recesses.

14. The tire of claim 12 wherein said recesses on one side of each said annular body are offset from said recesses on the other side of said annular body.

15. The roll of claim 14 wherein said recesses on one side of said annular body are offset from each other by about 90 degrees and said recesses on one side of said annular body are offset from said recesses on the other side of said annular body by about 45 degrees.

16. The tire of claim 12 wherein each said recess has a curved wall connecting said pair of generally planar abutment walls.

17. The tire of claim 16 wherein each said back wall is a substantially planar back wall which is adapted to abut the locking member.

18. The tire of claim 12 wherein each said recess has a depth of about one quarter of the thickness of said annular body at a position of said recesses.

19. A water-cooled roll for transportirg material through a furnace, said roll comprising:

a hollow rotatable arbor;

a water supply pipe positioned within said arbor spaced from the inner walls thereof by a plurality of spacers on an outer periphery of said pipe to create an annular space therebetween;

an end cap secured to one end of said arbor for positioning said pipe within said arbor;

a pipe end holder extending into said arbor at an opposite end of said arbor, said pipe end holder coupled to said pipe for positioning said pipe within said arbor;

a plurality of annular tires spaced along said arbor, each said tire including an annular body having an outer work contacting surface and an inner bore sized to receive said arbor therein, and a plurality of recesses adjacent said inner bore on opposite sides of said annular body; and a plurality of locking bars attached to said arbor, each said locking bar extending into one said recess of one said tire, wherein each said tire includes at least two locking bars extending into recesses on opposite sides thereof for rotationally and axially positioning said tire on said arbor.

* * * * *